July 24, 1962 J. W. COYNE 3,045,386
HEAD FOR SHELLFISH TRAPS
Filed July 9, 1959 2 Sheets-Sheet 1

*INVENTOR.*
JOHN W. COYNE
BY
Kenway, Jenney, Witter & Hildreth
ATTORNEYS

July 24, 1962  J. W. COYNE  3,045,386
HEAD FOR SHELLFISH TRAPS
Filed July 9, 1959  2 Sheets-Sheet 2

INVENTOR.
JOHN W. COYNE
BY
ATTORNEYS

United States Patent Office 3,045,386
Patented July 24, 1962

3,045,386
HEAD FOR SHELLFISH TRAPS
John W. Coyne, 262 Webster St., Manchester, N.H., assignor of one-third to Joseph P. Noonan, Manchester, N.H., and one-third to David Strater, York, Maine
Filed July 9, 1959, Ser. No. 825,902
9 Claims. (Cl. 43—100)

This invention relates to traps for shellfish such as lobsters, crayfish, and the like and, more particularly, to a new and improved head for use with such traps.

This invention is particularly concerned with lobster traps, although the invention has utility with similar traps for other shellfish. A lobster trap usually comprises a wooden frame structure to which is secured a plurality of laterally spaced wooden slats. A pair of aligned openings are provided in the sides of the trap at one end thereof for the entrance of lobsters within the trap. A generally conical or funnel shaped net is mounted in registry with each of these openings, with the nets extending toward each other and inwardly of the trap. These nets provide entrance ramps for the lobsters and are commonly referred to as "heads." The interior of the trap is usually divided into two compartments, the first being a compartment for holding bait to attract the shellfish, with this compartment containing the two heads just mentioned. Additionally, a second head usually extends laterally across the interior of the trap to provide a second compartment for holding the lobsters. This last-mentioned head is generally similar to those first mentioned, comprising a woven net having a funnel shaped or generally conical configuration and extending away from the bait compartment.

The tying of the nets for lobster heads requires considerable skill, as also does the mounting of the heads in the trap. The heads must be securely fastened to the trap, with the net being drawn taut in all dimensions to eliminate any slack. Correspondingly, the replacement of heads is a relatively time-consuming operation and most usually requires that the trap be returned to shore for a head replacement, thus resulting in loss of fishing time with an attendant economic loss.

It is the primary object of this invention to provide a novel and improved head for shellfish traps and particularly for lobster traps which will be relatively economical to manufacture, which will provide increased ease of installation and have a long life in salt water, and which will provide improved fishing ability of the trap.

Briefly, and in one aspect thereof, the invention contemplates a head for a lobster trap comprising a sheet of plastic material having a central opening for the passage of shellfish. The sheet additionally is provided with a plurality of series of arcuate incisions, with each of said series of incisions including a plurality of angularly spaced arcuate incisions disposed generally in end-to-end alignment concentrically of the central opening. Each of the series of incisions is spaced laterally of the next adjacent series, and the incisions of each series are angularly offset relative to the incisions of the next adjacent series and in a direction about said opening. The sheet is adapted to be fixed over an opening in the trap. A line or other suitable means is affixed to the bordering edge portion of the central opening in the sheet, and the bordering edge portion of said central opening is drawn away or displaced from the general plane of the sheet to expand the incised area of the sheet whereby there is provided a generally conical net-like structure equivalent to the previously used heads made from tied netting. The head may be simply made by stamping a sheet of suitable plastic material. Additionally, the head may be easily installed on a trap by providing suitable fastening means about the perimeter of the sheet. A more detailed understanding of the invention together with additional objects and advantages thereof may be had by reference to the following description taken in connection with the accompanying drawings, in which:

Figure 1:
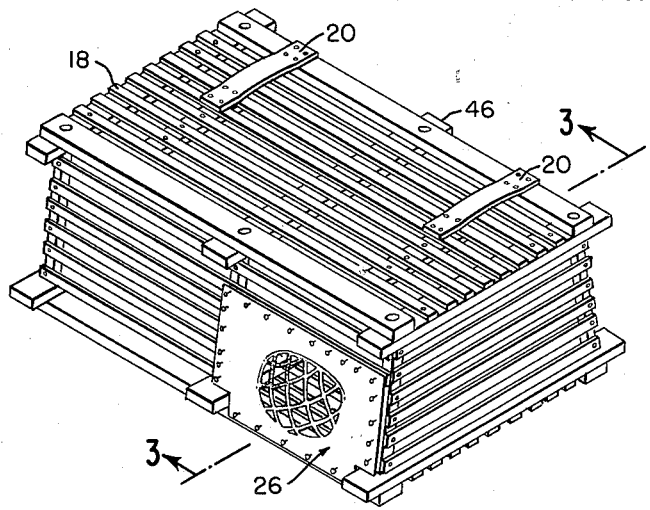
FIG. 1 is a perspective view of an exemplary lobster trap on which is installed a head constructed in accordance with the present invention.
Figure 3:
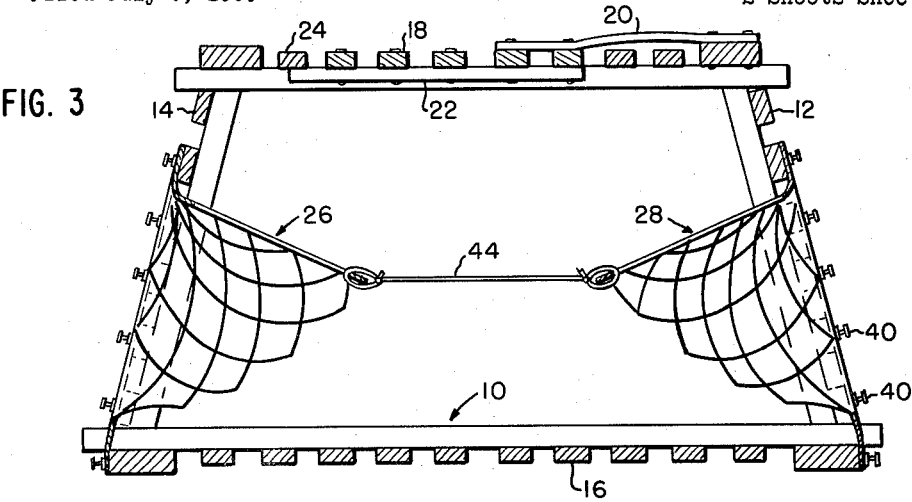
FIG. 3 is an enlarged cross sectional view substantially along the line 3—3 of FIG. 1.

With reference to the drawings and particularly FIGS. 1 and 3, an exemplary lobster trap shown therein comprises a wooden frame generally indicated at 10, with wooden slats suitably secured to the frame to provide the sides 12 and 14 of the trap as well as the bottom 16 thereof. The top of the trap includes a cover 18 fabricated similarly to the rest of the trap from wooden frame members and wooden slats and mounted on the trap by means of strips 20 of flexible material such as leather so as to provide a hinge for the cover 18. At least some of the frame members 22 of the top are adapted to be engaged under fixed slats 24 on the top of the trap, as shown in FIG. 3, so as to hold the cover closed. To open the cover, the cover is moved laterally of the trap away from the fixed slat 24 to disengage the cover, whereupon it may be swung upwardly to gain access to the trap.

Figure 2:
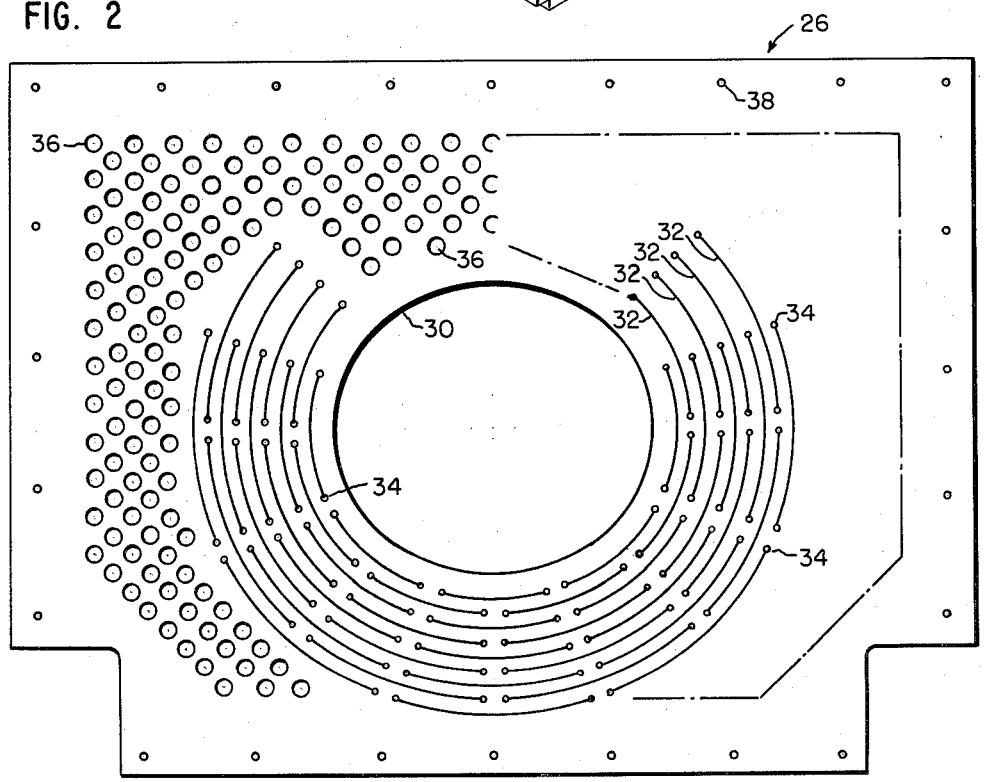
FIG. 2 is a plan view of a lobster head constructed in accordance with the present invention prior to installing the same in a trap.

As is customary, a pair of aligned openings are provided in the sides 12 and 14 respectively of the trap adjacent one end of the trap. Mounted to the trap in the area of these openings and generally about said openings are a pair of heads 26 and 28 constructed in accordance with the invention. The heads 26 and 28 are identical, and in the interest of brevity only the head 26 will be described in detail. With reference to FIG. 2, the head 26 comprises a sheet of flexible non-metallic material, such as polyvinyl plastic, which is translucent or possibly transparent. The sheet is provided with a relatively large central entrance opening 30 for the passage of shellfish. Disposed in radially spaced relation about the opening 30 are a plurality of series of elongated incisions 32. Each series of incisions includes a plurality of arcuate incisions 32, which are disposed in end-to-end alignment concentrically of the opening 30 and in radially spaced relation to said opening. The incisions in each series are preferably relatively closed spaced end to end, and each incision is provided with an aperture at the end thereof to eliminate any tendency for tearing in the region of the end of the incision. Each series of incisions is spaced radially from the next adjacent series. Further, the incisions of each series overlap the incisions of the next adjacent series; or, in other words, the incisions of each series are staggered relative to the incisions of the next series and in a direction angularly about the opening 30.

In the specific embodiment shown in FIG. 2, the incisions extend only partially around the opening 30 and more specifically approximately 270 degrees. There is thus provided an unincised area adjacent the top of the head which, as will later be seen, serves as a hinge for the bordering edge portion of the opening 30. However, as will be fully apparent hereinafter, if desired, the incisions may be disposed completely around the opening 30 in order to provide a different configuration of the head when assembled in the trap. Further, in the embodiment shown in FIG. 2, the series of incisions are relatively closely spaced from each other, and the next adjacent ends of next adjacent incisions in each series are generally centered relative to the next adjacent incision of the next adjacent series of incisions. Also, it will be seen that the incisions of alternate series radially outwardly of the opening 30 are angularly aligned and the incisions increase in length progressively from the radially innermost to the radially outermost series. The geometric configuration of the incisions may, of course, be varied from that shown in order to achieve a different final configuration of the head when installed.

A plurality of smaller openings 36 generally surrounding the incised area may be provided in the sheet forming the head. These openings will facilitate the passage of water through the head. A plurality of apertures 38 are provided around the outside edges or perimeter of the head to accommodate fastening means for fastening the head to the trap. The entire head may be fabricated from a sheet of suitable plastic material by a single stamping operation which will simultaneously shape the outside dimensions of the head and provide the various openings or incisions in the head.

Figure 4:
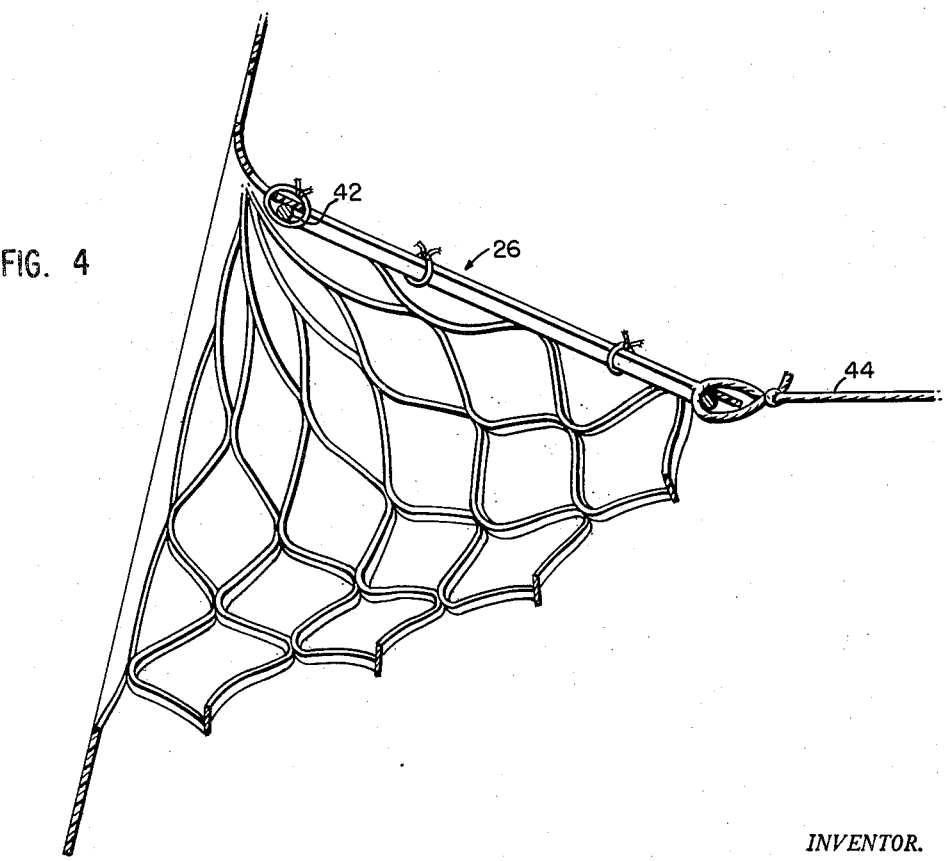
FIG. 4 is an enlarged view, partially in section, of one of the heads of FIG. 3.

The sheet is mounted to the frame of the trap generally over the opening in the side thereof such as by the double-headed nails 40 shown in FIG. 3 which extend through the apertures 38. Obviously, other suitable fastening means could be utilized. However, one advantage of a head constructed in accordance with the present invention is that with the proper size apertures 38 the head may be snapped over the outer head of a double-headed nail or the like, thus facilitating installation of the head and permitting easy replacement of the same at sea. With particular reference to FIG. 4, a rigid ring 42 of suitable material such as copper or a plastic which is resistant to salt water corrosion is mounted around the bordering edge portion of the aperture 30. The ring may, of course, be of any suitable desired geometric configuration, usually depending on the configuration of the opening 30. The ring may be easily secured to the head by tying the same, utilizing the apertures 34 at the ends of the innermost series of incisions and also the next adjacent openings 36. A cord or the like 44 is secured to the bottom of the ring 42 and is drawn generally laterally inwardly of the trap to hingedly pivot the bordering edge portion of the aperture 30 wherein the same extends angularly of the general plane of the sheet forming the head. As the bordering edge portion of the aperture 30 is drawn away from the general plane of the sheet, the incised area of the sheet will be drawn out of the plane of the sheet and will expand or separate to form a generally truncated conical net-like structure as shown in FIGS. 3 and 4. To facilitate installation of the heads 26 and 28, the cord 44 may be connected between the rings on the heads 26 and 28 as shown in FIG. 3 so as to provide a common means for maintaining the rings in the desired position angularly of the sheet.

While not shown, it will be understood that the trap may include a third head disposed within the trap and extending laterally across the trap in the region of the central frame member 46 of the top of the trap shown in FIG. 1. This head separates the trap into two compartments, one of which contains the heads 26 and 28 and which serves as a compartment in which bait is provided to lure the shellfish through the heads 26 and 28. The internal laterally extending head may be constructed generally in the same manner as the head 26 previously described to provide a generally conical net extending into the other or holding compartment of the trap into which lobsters may enter but from which they cannot escape.

As heretofore mentioned, the geometric configuration of the incisions 32 may be varied; and if, for example, the incisions are disposed entirely around the opening 30, the ring 42 could be drawn laterally inwardly of the trap to provide a generally frusto-conical head rather than the generally truncated conical head shown in this embodiment. Further, of course, the heads could be located in other areas of the trap, for example in the top thereof such as in crayfish traps. Additionally, the head of this invention is suitable for use with round, square, and other shape traps as well as the generally rectangular trap shown in the drawing.

The head should preferably be fabricated of a material which is easily workable in cold weather so as to facilitate installation of heads at sea in cold weather. A polyvinyl plastic having a relatively large percentage of plasticizer should be suitable. Further, the head is preferably translucent, or substantially invisible, so that when submerged its translucence and general geometric configuration will give the appearance of seaweed growth. This appearance of the head will, of course, enhance the fishing ability of the trap. The head is obviously of simple and straightforward manufacture, resulting in ease and economy of manufacture, and at the same time is much simpler and economical to install than previous tied net heads.

As will be apparent from the above, while the invention has been described in terms of a specific embodiment thereof, various alterations and modifications could be made without departing from the invention. Accordingly, the foregoing description and accompanying drawings are not to be taken as limiting the invention. The invention is to be limited only by the appended claims, which shall include within their scope all structure which logically falls within the language of these claims.

What I claim as new and desire to secure by Letters Patent of the United States is:

1. A head for a shellfish trap comprising a sheet of flexible material having an opening therethrough for the passage of a shellfish, the sheet being provided with a plurality of series of incisions with each of said series including a plurality of incisions arranged generally end to end and extending at least partially about said opening in radially outwardly spaced relation thereto, each series of incisions being spaced radially of said opening from the next adjacent series and the incisions in each series being staggered about said opening relative to the incisions of the next adjacent series, said incisions being arranged and spaced relative to each other so that when the bordering edge portion of said opening is displaced out of the general plane of said sheet the incised portion of the sheet will be expanded to provide a net like configuration.

2. A head for a shellfish trap comprising a sheet of flexible material having an opening therethrough for the passage of a shellfish, the sheet being provided with a plurality of series of incisions with each of said series including a plurality of incisions arranged generally end to end and about said opening in radially spaced relation thereto, the next adjacent ends of next adjacent incisions in each series being relatively closely spaced, each series being relatively closely spaced from the next adjacent series and in a direction radially of said opening, the incisions in each series being staggered relative to the incisions of the next adjacent series and in a direction about said opening, said plurality of series of incisions extending only partially about said opening to provide an unincised area forming a hinge-like portion so that the bordering edge portion of said opening may be displaced angularly out of the plane of said sheet.

3. A head for a shellfish trap comprising a sheet of flexible material having an opening therethrough for the passage of a shellfish, the sheet being provided with a plurality of series of elongated incisions with each of said series including a plurality of arcuate incisions arranged in end-to-end alignment and extending at least partially around said opening in radially outwardly spaced relation thereto, the next adjacent ends of next adjacent incisions in each series being relatively closely spaced, each series being relatively closely spaced from the next adjacent series and in a direction radially of said opening, the incisions in each series being staggered relative to the incisions of the next adjacent series, said incisions being arranged and spaced relative to each other so that when the bordering edge portion of said opening is displaced out of the general plane of said sheet the incised portion of the sheet will be expanded to provide a net like configuration.

4. A head for a shellfish trap comprising a sheet of non-metallic flexible material having an opening therethrough for the passage of shellfish, the sheet being provided with a plurality of series of incisions with each of said series including a plurality of elongated arcuate incisions arranged generally end to end and concentrically about said opening in radially spaced relation thereto, the next adjacent ends of next adjacent incisions in each series being relatively closely spaced and being generally centered longitudinally of the next adjacent incision in the next adjacent series, each series being relatively closely spaced from the next adjacent series and in a direction radially of said opening, said plurality of series of incisions extending only partially about said opening to provide an uncised area forming a hinge-like portion so that the bordering edge portion of said opening may be displaced angularly out of the plane of said sheet.

5. A head for a shellfish trap comprising a sheet of non-metallic flexible material having a central opening therein for the passage of a shellfish, the sheet having a plurality of series of incisions with each of said series comprising a plurality of arcuate incisions arranged generally in circular alignment at least partially around said opening and generally concentrically of said opening in radially outwardly spaced relation thereto, each series being relatively closely spaced from the next adjacent series and in a direction radially of said opening, the ends of each pair of next adjacent incisions in each series being relatively closely spaced and being generally centered longitudinally of the next adjacent incision in the next adjacent series, said incisions being arranged and spaced relative to each other so that when the bordering edge portion of said opening is displaced out of the general plane of said sheet the incised portion of the sheet will be expanded to provide a net like configuration, the sheet further being provided with a plurality of relatively closely spaced openings substantially smaller than the central opening with the smaller openings being disposed outside of the incised area of the sheet and providing for substantially free passage of water through the uncised area of the sheet.

6. In a shellfish trap having an opening, a head secured generally about said opening and comprising a sheet of flexible material having an entrance opening therethrough for the passage of a shellfish, the sheet being provided with a plurality of series of incisions with each of said series including a plurality of incisions arranged generally end to end and extending at least partially about said entrance opening in radially outwardly spaced relation thereto, each series of incisions being spaced radially of said entrance opening from the next adjacent series and the incisions in each series being staggered relative to the incisions of the next adjacent series in a direction angularly about said entrance opening, and means within the trap secured to the bordering edge portion of said entrance opening in the head and displacing said bordering edge portion from the initial general plane of the sheet whereby the incised portion of the sheet is expanded to form a net like configuration.

7. In a shellfish trap having side walls and a top, one of the side walls being provided with an opening, a head secured generally about said opening and comprising a sheet of flexible non-metallic material having an entrance opening therethrough for shellfish, the sheet being provided with a plurality of series of incisions with each of said series including a plurality of elongated incisions arranged generally end to end and extending only partially about said entrance opening to provide an uncised area adjacent the top of the trap, the next adjacent ends of each pair of next adjacent incisions in each series being staggered relative to the next adjacent incision in the next adjacent series, and means within the trap secured to the bordering edge portions of said entrance opening in the head and displacing the bottom of said bordering edge portion inwardly of the trap so that the general plane of said entrance opening is hingedly inclined from said uncised area and out of the general plane of the sheet so as to expand the incised area of the sheet and provide a net-like structure.

8. In a shellfish trap having a frame provided with an opening, a head secured generally about said opening and comprising an initially flat sheet of flexible plastic material having an entrance opening therethrough for the passage of a shellfish, the sheet being provided with a plurality of series of incisions with each of said series including a plurality of arcuate incisions arranged generally end to end and extending at least partially about said entrance opening in radially outwardly spaced relation thereto, each series of incisions being spaced radially of said opening from the next adjacent series and the incisions in each series being staggered relative to the incisions of the next adjacent series, means secured to the head adjacent the bordering edge portion of said opening maintaining said bordering edge portion displaced from the general plane of the sheet so that the incised portion of the sheet is expanded to provide a net-like structure, a plurality of nails driven into said frame around the peripheral portion of said sheet, each nail having a head and being received in an opening in said sheet, the sheet being disposed between the nail heads and frame and the openings receiving the nails being dimensioned so that the sheet may be snapped over the nail heads to assemble and disassemble the head and frame.

9. In a lobster trap having a pair of spaced side walls provided respectively with a pair of aligned openings at one end, a head secured generally about each of said openings and each comprising a sheet of flexible non-metallic material having a central entrance opening for shellfish, the sheet being provided with a plurality of series of incisions with each of said series including a plurality of elongate arcuate incisions arranged in end-to-end alignment and extending only partially about said entrance openings to provide an uncised area adjacent the top of the trap, the next adjacent ends of each pair of next adjacent incisions in each series overlapping the next adjacent incision in the next adjacent series, a rigid ring-like member secured to each head around the entrance opening thereof, and means connected between the bottoms of said ring-like members and drawing the bottoms of said ring-like members toward each other so as to hingedly displace the bordering edge portions of the entrance openings inwardly of the trap so that the general plane of said entrance openings is inclined from said uncised area and out of the general plane of the sheet so as to expand the incised area of the sheet and provide a net-like structure.

References Cited in the file of this patent

UNITED STATES PATENTS

| 2,551,236 | Bergman | May 1, 1951 |
| 2,597,002 | Johnson et al. | May 20, 1952 |
| 2,769,274 | Ougland | Nov. 6, 1956 |
| 2,847,790 | Tjernagel | Aug. 19, 1958 |